Sept. 29, 1970 P. L. JACHIM 3,531,590

AUTOMATIC GAIN CONTROL CIRCUIT

Filed Dec. 5, 1966

Inventor
PAUL L. JACHIM

BY Mueller, Aichele & Rauner

ATTYS.

United States Patent Office 3,531,590

Patented Sept. 29, 1970

3,531,590

AUTOMATIC GAIN CONTROL CIRCUIT

Paul L. Jachim, Franklin Park, Ill., assignor to Motorola, Inc., Franklin Park, Ill., a corporation of Illinois Filed Dec. 5, 1966, Ser. No. 599,102
Int. Cl. H04n 5/52
U.S. Cl. 178—7.5 9 Claims

ABSTRACT OF THE DISCLOSURE

An automatic gain control (AGC) circuit for a television receiver rapidly responds to changes in the level of a received television signal by using an AGC control transistor responsive to the synchronizing pulse components of the composite video signal, and including a short time constant current differentiating circuit coupled to the output of the transistor for providing current pulses having a energy content dependent on the amplitude of the synchronizing pulse components and relatively independent of the width of the synchronizing pulse components, with a further integrating circuit including a low value capacitance responsive to the current pulses for developing the automatic gain control signal.

If the amplitude of the demodulated composite video signal is allowed to vary over an excessive range, a strong incoming signal may cause the video amplifiers to become overloaded resulting in cross modulation and clipping of the synchronizing signal components while a weak incoming signal may cause the output of the video amplifier to be too low to provide proper picture reproduction. In addition, unwanted variations in contrast may result from a video signal which is changing in amplitude. To maintain the video signal relatively constant with variations in the level of the received television signal, an automatic gain control (AGC) circuit is commonly employed. The AGC function is generally accomplished by developing a control potential which is proportional to the strength of the incoming signal and is applied to one or more stages in the tuner and/or IF amplifier in a manner which decreases the gain as received signal strength increases. Since the composite video signal has a DC component which varies with the brightness of the scene being televised it would be undesirable to detect its average DC for AGC purposes. Instead a peak detector is utilized, but because it is quite susceptible to noise, means are provided to gate the AGC circuit on during horizontal deflection pulses so that the peak of the composite video signal is sampled only during those periods. Thus, noise in the video signal can affect the operation of the AGC circuit only during a small percentage of the video signal period. It is desirable that the AGC circuit respond rapidly in order to follow fading caused, for example, by signal reflections from passing airplanes, and to follow changes in the level of the received television signal when the tuned channel is changed from a strong incoming signal to a weak incoming signal and vice versa.

A gain control potential may be developed by coupling the composite video signal to a gating circuit which serves to allow conduction in the output thereof only during the presence of synchronizing pulses. The currents thus developed can be integrated by a capacitor across which the control potential is developed. The magnitude of the control potential should be dependent only on the amplitude of the synchronizing pulses in the composite video signal and not on the width of these pulses. In order to reduce the effect of the pulse variations on the control potential, prior art AGC systems have employed a rather large value load capacitor in order to integrate out any pulse width effects. However, since the time to charge and discharge a capacitor is dependent upon its value, the time required for the AGC circuit to respond to changes in the level of the received television signal will be that much slower. Since an airplane passing overhead may cause level changes on the order of several hundred cycles per second, a poor response time may appear in picture fading.

Accordingly, it is an object of this invention to provide an AGC circuit in which the potential used to control the tuner and IF amplifier stages responds to rapid changes in the level of the received television signal fast enough to maintain the signal at the output of the video amplifier relatively constant.

Another object is to detect the amplitude of the synchronizing signal components in a television signal to derive an automatic gain control potential and to provide means to maintain the control potential relatively independent of changes in the width of the synchronizing components.

Figures 1, 2, 3:
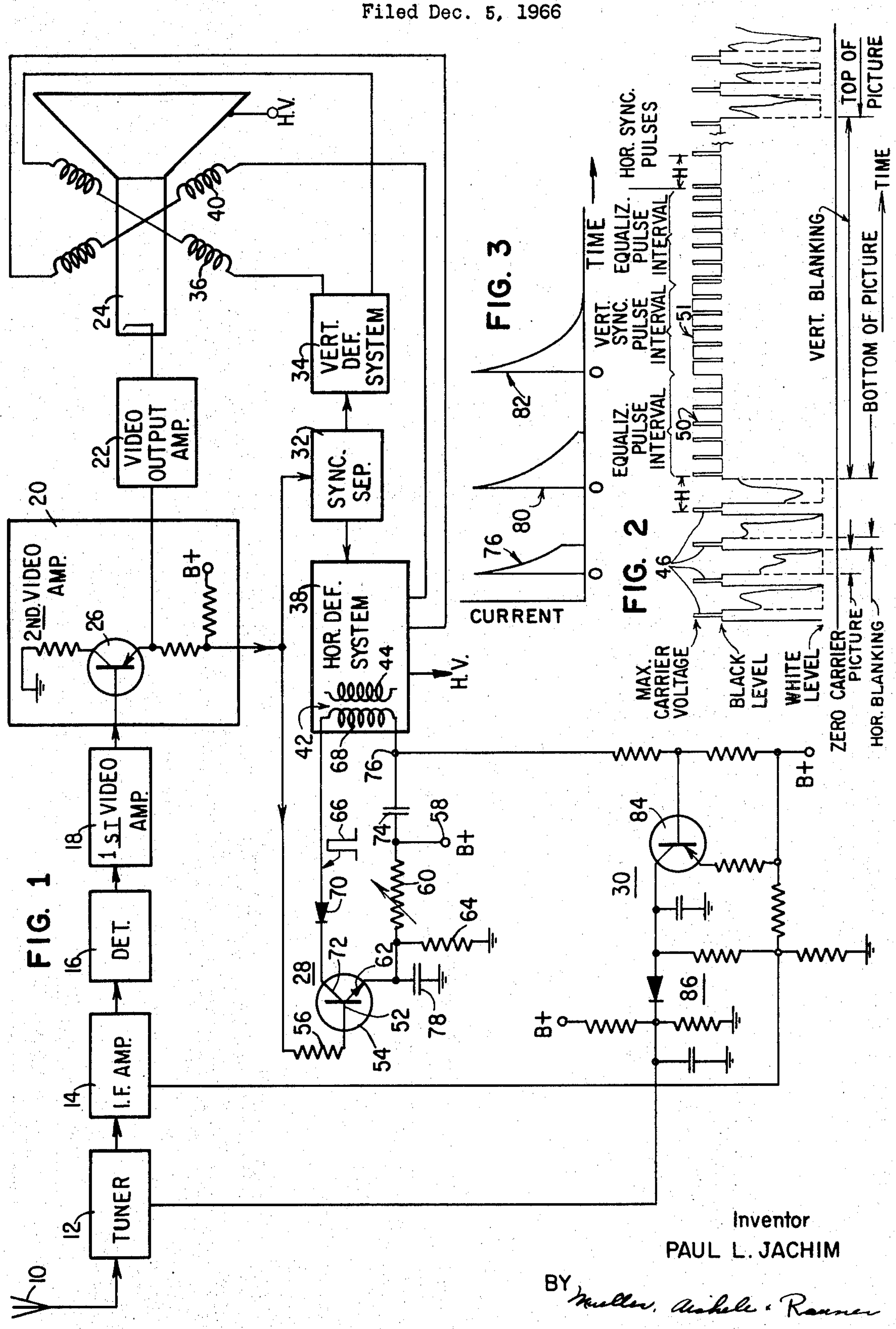
FIG. 1 illustrates a diagram partially schematic and partially in block of a television receiver incorporating the invention.
FIG. 2 is a representation of a composite video signal.
FIG. 3 illustrates current waveforms developed by the automatic gain control circuit of FIG. 1.

In brief, a signal amplifier in a wave signal receiver is provided to process and translate a received signal comprising pulse components subject to width and amplitude variations. The pulse components are applied through an input circuit to an electron control device such as a transistor. An output circuit connected to the electron control device includes a capacitor cooperating with resistance of the control device to form a current differentiating network. The pulse components cause conduction of the device so that current pulses are developed and applied to a load impedance which serves to integrate the current pulses and develop a control potential. The time constant of the differentiating network is selected so that the amplitude of the control signal is dependent upon the amplitude of the pulse components and relatively independent of the width of the pulse components. The combination of the capacitor and the control device may also be considered a voltage integrating network which serves to degenerate the control device to the wider pulse components. A feedback network couples the control signal to the signal amplifier to control the gain thereof.

Referring now to the drawings, the television receiver of FIG. 1 includes tuner 12 to receive and frequency convert incoming television signals appearing at antenna 10. The output intermediate frequency signal developed by tuner 12 is coupled through IF amplifier 14 to detector 16 to provide a demodulated composite video signal having video components and synchronizing components. The composite video signal is amplified in video amplifiers 18, 20 and 22 and applied to the cathode ray tube 24.

The demodulated television signal appearing at the emitter of transistor 26 is DC coupled to AGC circuit 28 wherein a DC control potential indicative of the strength of the received television signal is developed. The control potential is coupled to low pass amplifier 30 where it is amplified and applied to the emplifying devices in tuner 12 and IF amplifier 14 for the gain regulation thereof. The demodulated television signal is also coupled to sync separator 32 which separates the synchronizing signal components from the composite video signal. The vertical synchronizing components and equalizing components are applied to the vertical deflection system 34, which develops and applies a sawtooth wave current signal to the magnetic deflection yoke 36 on the cathode ray tube 24 for vertical scanning. The horizontal components are applied to horizontal deflection system 38, which develops a suitable sawtooth scanning current in magnetic deflection yoke 40 for horizontal deflection as well as providing high voltage to the screen of cathode ray tube 24 and gating pulses across primary winding 44 of transformer 42 for AGC circuit 28.

The foregoing description is applicable to the television receiver in general terms. Since such operation is generally well-known to those skilled in the art, further detailed discussion is believed to be unnecessary. The following description directly concerns the present invention in providing a fast acting automatic gain control circuit.

The composite video signal from second video amplifier 20 is shown in detail in FIG. 2. Starting from the left-hand side of the signal, four horizontal synchronizing pulses 46 each having a width of about 5 microseconds are shown and, as is well known, they extend above the black level. A horizontal blanking interval is associated with each of these pulses with the random signal between the blanking intervals comprising the information or video components. Immediately following the last active horizontal synchronizing pulse, the video signal is brought up to the back level by the vertical blanking pulse in preparation for vertical retrace. The vertical blanking period begins with six equalizing pulses labeled 50, each having a width of 2½ microseconds. These equalizing pulses are required to provide exact timing of the vertical retrace motion in successive fields. The serrated vertical synchronizing pulse 51 follows the equalizing pulses and its duration is three horizontal lines or about 190 microseconds with each of the serrations being on the order of 2½ microseconds in duration. Another series of equalizing pulses is next, followed by a number of 5 microsecond duration horizontal synchronizing pulses which continue to appear until the completion of vertical blanking. After removal of the vertical blanking pulse, active scanning is resumed and the composite video signal, including the information or video components, blanking, and synchronizing pulses for each active horizontal line continues for another field. It is important to note that three distinct pulse widths are present in the video signal, namely the 5 microsecond horizontal synchronizing pulse, the 2½ microsecond equalizing pulse and finally the 190 microsecond serrated vertical synchronizing pulse.

Referring back to FIG. 1, the composite video signal is applied to synchronizing separator 32 which separates the horizontal and vertical synchronizing components as explained previously. In addition, the composite signal is applied to the base 52 of a transistor 54 through resistor 56. Bias for the transistor is supplied from a DC energy source 58 through a variable resistor 60 to the emitter 62 of transistor 54. A resistor 64 connected from emitter 62 to a reference potential such as ground provides the desired voltage divider action. The variable resistor 60 is adjusted so that only a voltage greater than the black level in the signal of FIG. 2 will cause the transistor to conduct. In other words, only the pulse components in the composite signal will be reflected in the output circuit of the transistor 54.

A flyback pulse 66 is developed across secondary winding 68 of transformer 42 in the horizontal deflection system 38 at the end of each active horizontal scan line. The pulse has a constant amplitude so that it does not vary the conduction of AGC transistor 54. Flyback pulse 66 is applied to the anode of a diode 70 and is of the proper polarity to drive the same into conduction and cause it to be a low impedance for the duration of the pulse. The purpose of diode 70 is to block the ringing caused by the horizontal yoke during retrace and to prevent forward biasing of the base-to-collector junction of transistor 54. The width of the flyback pulse is approximately 15 microseconds so that a positive voltage is present on collector 72 to render transistor 54 operable to conduct current for a 15 microsecond interval. Current pulses through the collector-to-emitter junction of the transistor 54 are integrated in a load capacitor 74 connected from the bottom of secondary winding 68 to B+ in order to provide a control potential at the junction 76.

Since only the pulse components on base 52 cause conduction of the transistor, only whose portions of the video signal are of interest here. In order to fully appreciate the value of this invention, it is desirable to first explain the operation without it. Assuming at time zero that a gating pulse 66 appears, a positive voltage will be present on collector 72 for 15 microseconds. For reasons not important here, the pulses on base 52 do not commence until three microseconds after time zero. Thus, the horizontal synchronizing pulse 46 will cause transistor conduction from 3 microseconds to 8 microseconds, while equalizing pulse 50 causes transistor conduction from 3 microseconds to 5½ microseconds. Vertical synchronizing pulse 51 has a width many times longer than the interval that the flyback pulse 66 is present on collector 72 so that conduction occurs from 3 microseconds to 15 microseconds. This means that the transistor conducts for 5 microseconds in the presence of a horizontal sync pulse, 2½ microseconds in the presence of an equalizing pulse and 12 microseconds in the presence of a vertical sync pulse. The current pulses through load capacitor 74 will have an energy content determined by the energy content of the above three pulses.

Since the energy content of a pulse is proportional to its width times its amplitude, the load capacitor 74 cannot detect the difference between a narrow input pulse of high amplitude and a wider pulse of a smaller amplitude. Since the purpose of an automatic gain control circuit is to detect the amplitude of the pulses, if it were to additionally detect the pulse width, an improper gain control potential would appear at junction 76. In order to decrease the response to pulse width, prior circuits have utilized a relatively large load capacitor 74 so that the potential thereacross changes slowly with variations in the width of the applied pulses. However, this serves to degrade the response time of the circuit so that not only will the control potential change slowly with pulse width, it will also change slowly with pulse amplitude the latter being undesirable. A slow response time means that the gain of amplifying stages in tuner 12 and IF amplifier 14 will not be adjusted fast enough when there are rapid changes in the level of the received signal at antenna 10.

In order to lower the sensitivity to pulse width without degrading response time, the invention provides a capacitor 78 connected from emitter 62 to ground. This, in combination with the collector-to-emitter resistance of transistor 54 and any external resistance in the output circuit, defines a current differentiating circuit or expressed in another way, a voltage integrating circuit.

The current differentiating or voltage integrating circuit may have any desired time constant by merely selecting the value of capacitor 78. Reference is made to FIG. 3 which illustrates the current pulses associated with respective ones of the pulse components applied to base 52. Pulse 76 is developed in response to the equalizing pulse 50, pulse 80 in response to horizontal sync pulse 46, and pulse 82 in response to vertical sync pulse 51. The trailing edge of each of the current pulses has the same generally exponential slope except for variations due to differences in the collector-to-emitter resistance of transistor 54 for different ones of the pulse components at base 52. The pulses shown in FIG. 3 are the result of a time constant of one-half the shortest pulse or about 1¼ microseconds. This means that the current will decay 63% after an interval equal to one time constant, 86% after two time constants or 2½ microseconds, 98% at the end of 4 time constants or 5 microseconds, etc. There will be an abrupt current decay when the pulse components at base 52 are removed and in the case of the vertical sync pulse when the flyback pulse 66 is removed. Therefore, the duration of pulse 76 is 2½ microseconds, the duration of pulse 80 is 5 microseconds and the duration of pulse 82 is 12 microseconds. Assuming for the moment that pulse components 50 and 46 are of the same amplitude, it may be seen that the energy content of the latter is double that of the former whereas the energy content in current pulse 80 is only about 14% greater than that in pulse 76. A similar analysis yields an even closer relationship between the energy contents of pulses 80 and 82.

As the differentiation is increased or in other words as the time constant is decreased, the difference in energy content between the three current pulses becomes less and less, which, of course, is desirable. However, the limiting factor would be the minimum energy necessary to drive succeeding stages in the AGC circuitry. It may be appreciated that if the energy in the input pulses is high enough, the energy content in the current pulses may be made to differ very little even though the pulse width changes. It is to be understood that decreasing the degree of differentiation from that shown in FIG. 3 still provides advantage over that where no differentiation is employed. So that, instead of using a time constant equal to one-half the shortest pulse, the time constant may be, for example, be equal to 2½ microseconds in which case current pulse 76 would decay to 63% rather than 86% in 2½ microseconds and pulse 80 would decay to 86%in 5 microseconds rather than 98%. Now the difference in energy content between the two current pulses is on the order of 37% which still provides improvement over the 100% difference in the case of no differentiation. The comparison between the input and output pulses may be made current wise on the basis that the relative energy content of the input current pulses would be approximately the same as the relative energy content of the corresponding input voltage pulses.

Another way of looking at the lowered sensitivity to pulse width is to consider the voltage build up on emitter 62. The capacitor 78 in combination with the collector-to-emitter resistance of transistor 54 defines a voltage integrating circuit or a degenerative circuit. The capacitor has a small enough value to allow the voltage developed on emitter 62 to build up to a value tending to cut off the transistor within a relatively short time following commencement of the input pulse on base 52. As those skilled in the art will appreciate, the characteristic of the voltage waveforms on the emitter will have an appearance similar to the current waveforms of FIG. 3 except that they will be inverted and the voltage at time zero will be the biasing voltage established by variable resistor 60 and resistor 64. When the emitter voltage reaches a value determined by the time constant of the integrating circuit, the conduction of transistor 54 will have been reduced and different width input pulses will not change the conduction significantly so that the control voltage at junction 76 is maintained independent of pulse width. Selecting the time constant will again be dependent on the energy required to drive succeeding stages. Upon completion of an input pulse, the voltage on emitter 62 will decay through resistor 64 to ground.

It is important to note that the decrease in sensitivity to pulse width has had no deteriorating effect on the response to pulse amplitude. Thus, if the input pulse increases 10% the energy in the current pulse will increase by a like amount. The current pulses are integrated in capacitor 74 which can desirably have a low value since there is no need to integrate out pulse width differences. A low value capacitor can charge and discharge quickly so that if the received signal at antenna 10 decreases, thereby reflecting a corresponding decrease in the amplitude of the pulse components supplied to the base 52, the control potential at junction 76 will change rapidly in response thereto.

The control potential is coupled to low pass amplifier circuit 30 which is capable of amplifying a DC voltage that may change in value as rapidly as a few hundred cycles per second when, for example, an airplane passes overhead. The output of transistor 84 is applied to isolation and divider network 86 to provide AGC voltage for amplifying stages in tuner 12 and IF amplifier 14. The AGC action serves to maintain the video signal independent of changes in the level of received television signal.

The AGC circuit provides improved rejection to noise which may occur in the video signal because the energy in a noise pulse is reduced by the differentiation action of AGC circuit 28. Also, the rapid decay of a noise pulse returns the circuit 28 to its normal operating conditions quickly. Of course, any noise occurring during the interval when information or the video components are being transmitted will not affect the AGC circuit at all because it is gated on only during synchronizing intervals.

What has been described, therefore, is a fast acting AGC circuit which reacts rapidly to changes in the level of a received television signal to continually reset the gains of the amplifiying stages so that the video signal is independent of these changes. This is accomplished without increasing the sensitivity of the control circuit to the various widths of the pulse components applied thereto.

What is claimed is:

1. In a television receiver having a cathode ray tube, with means for providing horizontal flyback pulses for controlling the horizontal scan of the cathode ray beam, and means for developing a vertical deflection signal for vertically scanning the cathode ray beam, and having a signal amplifier for translating a received signal having synchronizing signal components consisting at least of pulse components of a first width to synchronize the horizontal flyback pulses and pulse components of a second width for synchronizing the vertical deflection signal, the pulse components being subject to amplitude variations, with means responsive to the output of the signal amplifier for separating the synchronizing signal components and applying them to the means for providing the horizontal flyback pulses and the means for developing the vertical deflection signal to synchronize the operation of these means with the synchronizing components, said television receiver further having an automatic gain control circuit including in combination: an electron control device adapted to respond to amplitude variations in an applied pulse; an input circuit for applying the pulse components from the signal amplifier to the electron control device; circuit means having a short time constant relative to the width of the pulse components coupled to the control device and cooperating therewith to respond to the pulse components to develop current pulses having an energy content dependent upon the amplitude of the pulse components and relatively independent of the width of the pulse components; a load impedance coupled to the electron control device and responsive to the current pulses to develop a control signal indicative of the energy content of the current pulses; and means coupling the control signal to the signal amplifier to control the gain thereof.

2. In a wave signal receiver including a signal amplifier for transplanting the received signal having pulse components subject to width and amplitude variations, an automatic gain control circuit including in combination; an electron control device adapted to respond to amplitude variations in an applied pulse, an input circuit for applying the pulse components to said control device, an output circuit including a voltage integrating network having a short time constant relative to the width of the pulse components coupled to the output of said control device for generating a voltage in response to the pulse components for cutting off said control device within the interval of the narrowest of the pulse components so that the conduction of the device is dependent on the amplitude of the pulse components and relatively independent of the widths thereof, said output circuit further including a load impedance responsive to the conduction of said device to develop a control signal indicative of the amplitude of the pulse components, and means coupling said control signal to the signal amplifier to control the gain thereof.

3. The combination according to claim 1 in which the circuit means coupled to the control device for developing said current pulses forms a current differentiating network.

4. The wave signal receiver according to claim 3, said pulse components having the same amplitude for a received signal of a given level and different pulse widths so that their energy contents are different, said current differentiating network having a time constant selected to cause the difference in energy content between said current pulses to be less than the difference in energy content between their associated pulse components at said given level.

5. The wave signal receiver according to claim 3, said electron control device having a pair of output electrodes with an internal resistance appearing thereacross, said output circuit coupled to said output electrodes, said circuit means including capacitance means in series circuit with said pair of output electrodes to form said current differentiating network having a selected time constant, said pulse components having the same amplitude for a received signal of a given level and different pulse widths so that their energy contents are different, said capacitance means having a value selected to cause the difference in energy content between said current pulses to be less than the difference in energy content between their associated pulse components at said given level.

6. The wave signal receiver according to claim 5, said electron control device comprising a transistor with said pair of output electrodes being a collector and an emitter.

7. The wave signal receiver according to claim 3, said load impedance comprising an integrating circuit including capacitance means having a low value selected to cause the control signal developed thereacross to rapidly follow changes in the amplitude of said pulse components.

8. The wave signal receiver according to claim 3, wherein the time constant of said current differentiating network is less than the width of the shortest of said pulse components.

9. The wave signal receiver according to claim 7, said capacitance means of said load impedance having a value selected to cause said control potential to follow fluctuations of several hundred cycles per second.

References Cited

UNITED STATES PATENTS

| | | |
|---|---|---|
| 2,878,312 | 3/1959 | Goodrich. |
| 2,906,817 | 9/1959 | Kidd et al. |
| 2,979,563 | 4/1961 | Kidd. |

ROBERT L. GRIFFIN, Primary Examiner

R. P. LANGE, Assistant Examiner

U.S. Cl. X.R.

178—7.3; 325—410, 411